Patented Feb. 11, 1947

2,415,599

UNITED STATES PATENT OFFICE 2,415,599

PRODUCTION OF 1,1,3-TRIMETHYLCYCLOPENTANE

Joseph B. McKinley, Pittsburgh, Pa., assignor to Gulf Research & Development Company, Pittsburgh, Pa., a corporation of Delaware No Drawing. Application December 29, 1944, Serial No. 570,474

9 Claims. (Cl. 260—666)

The present invention relates to the synthesis of 1,1,3-trimethylcyclopentane.

Copending application, Serial No. 570,475, filed on even date herewith and entitled "Production of 1,1,3-trimethylcyclopentane by thermal polymerization of isobutylene" discloses that the cyclic hydrocarbon (1,1,3-trimethylcyclopentane) which is produced according to the invention therein disclosed, by the thermal polymerization of isobutylene, is characterized by the following properties:

| | |
|---|---:|
| Boiling point, °C. at 760 mm | 105.0 |
| Specific gravity at 20°/4° C | 0.7480 |
| Refractive index, $n_D^{20}$ | 1.4108 |
| Molecular weight | 113 |
| Viscosity at 20° C. | |
|     Centistokes | 0.828 |
|     Centipoise | 0.619 |
| Aniline point, °C | 59.8 |
| Carbon _____ per cent | 85.82 |
| Hydrogen _____ do | 14.51 |
| Weight carbon-hydrogen ratio | 5.91:1 |
| Molecular refraction | 37.22 |

Alternative methods for the preparation of the aforesaid cyclic hydrocarbon, which is useful among other things as a solvent and as an intermediate for the chemical synthesis of other compounds, such as naphthenes and the like, are manifestly desirable.

A primary object of the present invention is the development of synthetic methods for the production of 1,1,3-trimethylcyclopentane.

Briefly stated, this object may be realized, according to the present invention, by starting from 1,3-dimethylcyclopentanol (see Chavanne, G., Bull. soc. chim. Belg. 35, 283 (1926)) as the initial or parent material, converting the same into the compound, 1-chloro-1,3-dimethylcyclopentane, and then completing the synthesis of the 1,1,3-trimethylcyclopentane with the aid of an organo-metallic reagent adapted to replace the 1-chloro substituent by a methyl group, for example zinc dimethyl and methyl magnesium iodide. The synthesis may also be effected by way of the corresponding 1-bromo- or 1-iodo-1,3-dimethylcyclopentane.

The following illustrative examples typify presently preferred embodiments of the invention.

EXAMPLE 1

132.4 parts by weight of 1,3-dimethylcyclopentanol are charged into a reactor, which is provided with a mercury-seal stirrer, a gas-inlet dipping into the pentanol, and a vent tube. The reactor is immersed in a bath at 0° C., stirring is commenced, and when the pentanol has cooled to about 2° C., 57.6 parts by weight of dry hydrogen chloride are slowly added. The crude product is washed with water, then with saturated sodium bicarbonate solution, then with water, and finally dried over calcium chloride. A yield of 146.0 parts by weight of unrefined 1-chloro-1,3-dimethylcyclopentane (95% based on the 1,3-dimethylcyclopentanol) is obtained.

Fractionation of the product through a 20-plate column at 15 mm. pressure, using a reflux ratio of 20:1, demonstrates its essential homogeneity. Superheating of the product during distillation is avoided by immersing the still pot in a water bath at 45–50° C. The heart cut obtained (119.2 parts by weight) boils at 33.2° C./15 mm. The product of this boiling point consisting of substantially pure 1-chloro-1,3-dimethylcyclopentane has a density, $d_4^{20}$, of 0.9347, a refractive index, $n_D^{20}$, of 1.4406 and is optically inactive.

150 parts by weight of dry xylene and 20 parts by weight of zinc dimethyl are introduced into a three-neck round-bottom reactor fitted with a dropping funnel, a reflux condenser, a thermometer, and a mercury-seal stirrer. Stirring is commenced and 53 parts by weight of 1-chloro-1,3-dimethylcyclopentane, dissolved in 53 parts by weight of xylene are added to the reactor in one hour. The reaction temperature is maintained at about 25° C. during this operation with the aid, for example, of a bath in which the reactor is immersed. After the addition of the chloride-xylene mixture is complete, the stirred reaction mixture is heated slowly to 40° C. and is maintained at this temperature for one-half hour. The cooled reaction product is treated with a mixture of concentrated hydrochloric acid and water (1:4 by vol.) to decompose unreacted zinc dimethyl. It is then washed with saturated sodium bicarbonate solution and with water, dried over calcium chloride, and finally refluxed over sodium to destroy any unreacted 1-chloro-1,3-dimethylcyclopentane. Fractionation of the product at atmospheric pressure results in a yield of 15.6 parts by weight (34.7% yield based on the chloride) of compound boiling at about 105° C.

To purify the product, it may be fractionated through a 62-plate column at atmospheric pressure (reflux ratio 30:1) and a heart cut separated at B. P. 103.6–103.7° C./735 mm. (equivalent to 105.0° C. at 760 mm.). This cut is then filtered through silica gel to free it of traces of unsaturated compounds and solvent xylene. The purified product is 1,1,3-trimethylcyclopentane; see properties as set forth in comparative table of properties, infra.

EXAMPLE 2

60.9 parts by weight of desiccated magnesium and 191 parts by weight of dibutyl ether are introduced into a three-neck round-bottom reactor, fitted with a mercury-seal stirrer, a dropping funnel, and a reflux condenser closed, at the upper end, with a calcium chloride tube. Stirring is commenced and 356 parts by weight of methyl iodide in 305 parts by weight of dibutyl ether are added to the reactor in 100 minutes, the reaction temperature being maintained at 35° C. When the addition of the methyl iodide solution is complete, 290 parts by weight of dibutyl ether are added to the reactor. The preparation of methyl magnesium iodide is completed by heating the stirred reaction mixture to and maintaining it at 39° C. for 95 minutes.

308 parts by weight of 1-chloro-1,3-dimethyl-cyclopentane in 221 parts by weight of dibutyl ether are then added to the reaction mixture containing the aforementioned Grignard reagent, in 40 minutes. Thereafter stirring is continued until the reaction mixture cools to room temperature. The reaction mixture is then treated with water and with dilute acetic acid to dissolve any precipitate which forms. The oil layer is separated and washed with 10% alkali, then with water, and finally dried with anhydrous potassium carbonate. It is fractionated through a 15-plate column at atmospheric pressure to obtain the fraction boiling from 90.8–129.0° C. This fraction is combined with xylene, refluxed over sodium, and finally fractionated through a 62-plate column at atmospheric pressure (reflux ratio 30:1). A yield of 19.3% (based on the chloride) of 105° C.-boiling naphthene is obtained. A heart cut (B. P. 104.0–104.1° C./745 mm.) may be further purified by filtration through silica gel. The purified product is 1,1,3-trimethylcyclopentane; see comparative table of properties, infra.

Comparison of the properties of the highly purified products according to the foregoing examples with those of the cyclic dimer obtained according to the aforesaid copending patent application and with the theoretical properties for 1,1,3-trimethylcyclopentane establishes the essential identity of the several products, as shown by the following table:

*Comparison of 1,1,3-trimethylcyclopentane with the cyclic dimer of isobutylene*

|  | Cyclic dimer of isobutylene | Product of Grignard reaction | Zinc dimethyl reaction product | Theoretical product |
|---|---|---|---|---|
| Boiling pt., 760 mm. ° C | 105.0 | 105.0 | 105.0 | |
| Sp. gr. at 20°/4° C | 0.7480 | 0.7481 | 0.7481 | |
| Refractive index, $n_D^{20}$ | 1.4108 | 1.4109 | 1.4109 | |
| Molecular weight | 113 | 113 | 112 | 112.2 |
| Viscosity at 20° C.: | | | | |
| Centistokes | 0.828 | 0.827 | 0.827 | |
| Centipoise | 0.619 | 0.619 | 0.619 | |
| Aniline point ° C | 59.8 | 59.7 | 59.7 | |
| Carbon per cent | 85.82 | 85.81 | 85.55 | 85.63 |
| Hydrogen do | 14.51 | 14.49 | 14.44 | 14.37 |
| Weight carbon-hydrogen ratio | 5.91:1 | 5.92:1 | 5.92:1 | 5.96:1 |
| Molecular refraction | 37.22 | 37.22 | 37.22 | 36.94 |

It is clear from the foregoing that the present invention provides novel synthetic means for the production of 1,1,3-trimethylcyclopentane.

Having thus disclosed the invention, what is claimed is:

1. A process for the preparation of 1,1,3-trimethylcyclopentane, which comprises reacting 1,3-dimethylcyclopentanol-1 with hydrogen halide, and then subjecting the resultant 1-halo-1,3-dimethylcyclopentane to the action of an organometallic reagent selected from the group consisting of zinc dimethyl and methyl magnesium halide, whereby the 1,1,3-trimethylcyclopentane results.

2. A process for the preparation of 1,1,3-trimethylcyclopentane, which comprises reacting 1,3-dimethylcyclopentanol-1 with hydrogen chloride, and then subjecting the resultant 1-chloro-1,3-dimethylcyclopentane to the action of an organometallic reagent selected from the group consisting of zinc dimethyl and methyl magnesium halide, whereby the 1,1,3-trimethylcyclopentane results.

3. A process for the preparation of 1,1,3-trimethylcyclopentane, which comprises reacting 1,3-dimethylcyclopentanol-1 with hydrogen chloride, and then subjecting the resultant 1-chloro-1,3-dimethylcyclopentane to the action of zinc dimethyl, whereby the 1,1,3-trimethylcyclopentane results.

4. A process for the preparation of 1,1,3-trimethlcyclopentane, which comprises reacting 1,3-dimethylcyclopentanol-1 with hydrogen chloride, and then subjecting the resultant 1-chloro-1,3-dimethylcyclopentane to the action of methyl magnesium halide, whereby the 1,1,3-trimethylcyclopentane results.

5. In a process for the synthesis of 1,1,3-trimethylcyclopentane, the step of reacting 1-halo-1,3-dimethylcyclopentane with a member selected from the group of organometallic reagents consisting of zinc dimethyl and methyl magnesium halide.

6. In a process for the synthesis of 1,1,3-trimethylcyclopentane, the step of reacting 1-chloro-1,3-dimethylcyclopentane with a member selected from the group of organometallic reagents consisting of zinc dimethyl and methyl magnesium halide.

7. In a process for the synthesis of 1,1,3-trimethylcyclopentane, the step of reacting 1-chloro-1,3-dimethylcyclopentane with zinc dimethyl, whereby the 1-chloro substituent is replaced by a methyl group.

8. In a process for the synthesis of 1,1,3-trimethylcyclopentane, the step of reacting 1-chloro-1,3-dimethylcyclopentane with methyl magnesium halide, whereby the 1-chloro substituent is replaced by a methyl group.

9. 1,1,3-trimethylcyclopentane, having a boiling point of 105.0° C. at 760 mm. pressure, a specific gravity of 0.7480–0.7481 at 20°/4° C., and a refractive index, $n_D^{20}$, of 1.4108–1.4109.

JOSEPH B. McKINLEY.

REFERENCES CITED

The following references are of record in the file of this patent:

Gilman Organic Chemistry vol. 1, pages 424–5. (Copy in Division 31.) Beil, 2nd Supp. page 19. (Copy in Division 6.) Day et al., J. Chem. Soc. (1935) 1063–5; C. A. 29, 7294. (Copy both Patent Office Library.) Zelinskii et al., J. Russ. Phys. Soc. 45, 831–42; Ber. 46, 1466–74; C. A. 7, 3600.